United States Patent Office 3,105,064
Patented Sept. 24, 1963

3,105,064
POLYMERS CONTAINING PHOSPHORUS
Hans Bernhard Adolf Krämer, Frankfurt am Main, Günter Messwarb, Kelkheim, Taunus, and Walter Denk, Frankfurt am Main, Germany, assignors to Farbwerke Hoechst Aktiengesellschaft vormals Meister Lucius & Brüning, Frankfurt am Main, Germany, a corporation of Germany
No Drawing. Filed Sept. 17, 1957, Ser. No. 684,438
Claims priority, application Germany Sept. 25, 1956
8 Claims. (Cl. 260—80)

The present invention relates to polymers containing phosphorus.

In U.S. patent application Serial No. 667,478, filed on May 7, 1957, by Günter Messwarb, Walter Denk and Hans Scherer, now U.S. Patent 2,971,948, granted February 14, 1961, it has already been proposed to copolymerize vinyl phosphonic acid dichloride with vinyl chloride. The preparation of vinyl phosphonic acid dichloride is disclosed in copending application Serial No. 645,028, filed March 11, 1957, by Schimmelschmidt and Denk.

Now we have found that the polymerization of compounds of the general formula:

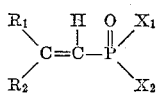

wherein $X_1$ and $X_2$ represent identical or different halogen atoms and $R_1$ and $R_2$ stand for a hydrogen atom, an alkyl radical containing 1 to 4 carbon atoms in a straight or branched chain, a cycloalkyl radical, for example a cyclohexyl radical, or an aryl radical, for example a phenyl or naphthyl radical, or an arylalkyl radical, for example a benzyl radical, and which may also stand for identical or different substituents, leads to liquid or solid products by polymerizing the above compounds with themselves or with other polymerizable compounds containing one single or more olefinic bonds, with the exception of vinyl chloride.

As copolymerization components suitable for use in the invention there may be used vinyl phosphonic acid halides and the derivatives thereof and also styrene or styrenes alkylated in the nucleus and/or in the side chain for example with a $CH_3$— or $C_2H_5$— group, divinylbenzene or vinyl esters in which the acid group may contain 1 to 18 carbon atoms which may be arranged in an open chain or in cyclic manner; there may also be used vinylidene chloride, butadiene, acrylonitrile or esters of acrylic or methacrylic acid, for example those esters in which acrylic or methacrylic acid is esterified with aliphatic, straight or branched monohydric alcohols having a chain length of 1 to 4 carbon atoms. The aforesaid monomers which are free from phosphorus may be used individually or in combination with one another. The proportion of vinyl phosphonic acid halides and the derivatives thereof to the other copolymerization component or components may vary within wide limits, for example within the ranges of 0.1 to 99.9 and 99.9 to 0.1.

Polymerization or copolymerization is carried out at a temperature within the range of between —50° C. and +200° C., preferably between 0° and 100° C., and advantageously with addition of catalysts yielding radicals and/or under the action of ultra-violet light, and substantially with exclusion of moisture. The catalysts are preferably used in a quantity of between 0.1–10% by weight calculated upon the monomer used.

As catalysts it is preferred to use compounds which dissolve well in organic solvents, for example benzoyl peroxide, lauroyl peroxide, caproyl peroxide, caprylyl peroxide, tertiary butyl peroxide, tertiary butyl perbenzoate or azoisobutyric acid dinitrile.

The polymerization may be carried out in a heterogeneous or in a homogeneous system.

The polymers or copolymers obtained by this invention are viscous to hard transparent products which smoke when exposed to air with evolution of hydrogen halide and which react vigorously with water. Polymers of vinyl phosphonic acid halides dissolve well in various solvents, for example in acetone and methylene chloride, whilst copolymers of these acid halides are in most cases cross-linked with other compounds containing one single or more olefinic bonds, and are only partially soluble, if at all.

The polymers obtained by this invention are interesting intermediates for the production of plastic materials, flame-proofing agents, textile auxiliary agents or wetting agents and emulsifiers.

The following examples serve to illustrate the invention but they are not intended to limit it thereto:

*Example 1*

A mixture of 50 grams of styrene and 5 grams of vinyl phosphonic acid dichloride was refluxed for 24 hours under pure nitrogen while 0.5 gram of benzoyl peroxide was added. A colorless, transparent and hard polymer was obtained which did not dissolve in benzene but swelled with strong increase in volume to yield a viscous elastic gel.

*Example 2*

35 grams of vinyl phosphonic acid dichloride which contained 0.35 gram of dissolved azoisobutyric acid dinitrile in a small closed glass flask transmitting ultraviolet light were exposed for 4 weeks at about 20° C. under a nitrogen atmosphere to the action of sunlight. A slightly yellowish, highly viscous and transparent mass was obtained. The remaining monomer was distilled off in vacuo and a solid transparent polymer was obtained which gave rise to smoke formation of hydrogen chloride when exposed to air. The polymer so obtained was well soluble inter alia in acetone and methylene chloride. The solution was precipitated by addition of petroleum ether (a hydrocarbon boiling between 40 and 80° C.) to yield a white, fibrous mass. A 1% solution of the above polymer in methylene chloride had a specific viscosity of 0.25. The yield was 73% of the theory.

*Example 3*

200 grams of freshly distilled vinyl phosphonic acid dichloride and 2 grams of benzoyl peroxide were heated to 70° C. under reflux in pure nitrogen. After 48 hours, the whole mixture had polymerized to yield a solid, transparent and slightly yellowish mass. The polymer obtained had the properties of Example 2.

*Example 4*

A mixture of 50 grams of acrylonitrile, 2 grams of vinyl phosphonic acid dichloride and 0.5 gram of dibenzoyl peroxide was filled into a pressure bottle of 100 cc. capacity and heated to 60° C. in a water bath while the pressure bottle was constantly moved. Polymerization was complete after 5 to 6 hours. A white, dry and granular polymer was obtained which was treated with dimethylformamide to yield a solution containing most finely swollen particles. Fibers produced from this solution could be well dyed with basic dyestuffs after treatment with hot water.

*Example 5*

A mixture of 10 grams of vinyl phosphonic acid dichloride, 30 grams of methylmethacrylate and 0.5 gram of dibenzoyl peroxide in a round flask of 100 cc. capacity and provided with a reflux condenser was slowly heated to 70° C. in a nitrogen atmosphere until a solid transparent mass was obtained. The product was soluble in benzene.

We claim:

1. A process for the production of phosphorus-containing polymers which comprises copolymerizing vinyl phosphonic acid dichloride with at least one member selected from the group consisting of styrene, alkylated styrenes, divinyl benzene, vinyl esters of acids having 1 to 18 carbon atoms, vinylidene chloride, butadiene, acrylonitrile, esters of acrylic acid with aliphatic alcohols having 1 to 4 carbon atoms, and esters of methacrylic acid with aliphatic alcohols having 1 to 4 carbon atoms, at a temperature within the range of −50° C. to 200° C., under the influence of ultraviolet light and a catalyst selected from the group consisting of organic peroxides and azobutyric dinitrile, substantially with exclusion of moisture.

2. A process for the production of phosphorus-containing polymers which comprises copolymerizing vinyl phosphonic acid dichloride with at least one member selected from the group consisting of styrene, alkylated styrenes, divinyl benzene, vinyl esters of acids having 1 to 18 carbon atoms, vinylidene chloride, butadiene, acrylonitrile, esters of acrylic acid with aliphatic alcohols having 1 to 4 carbon atoms, and esters of methacrylic acid with aliphatic alcohols having 1 to 4 carbon atoms, at a temperature within the range of −50° C. to 200° C., under the influence of ultraviolet light, substantially with exclusion of moisture.

3. A process for the production of phosphorus-containing polymers which comprises copolymerizing vinyl phosphonic acid dichloride with at least one member selected from the group consisting of styrene, alkylated styrenes, divinyl benzene, vinyl esters of acids having 1 to 18 carbon atoms, vinylidene chloride, butadiene, acrylonitrile, esters of acrylic acid with aliphatic alcohols having 1 to 4 carbon atoms, and esters of methacrylic acid with aliphatic alcohols having 1 to 4 carbon atoms, at a temperature within the range of −50° C. to 200° C., under the influence of a catalyst selected from the group consisting of organic peroxides and azobutyric dinitrile, substantially with exclusion of moisture.

4. A process for the production of phosphorus containing polymers which comprises polymerizing vinyl phosphonic acid dichloride at a temperature in the range of −50° C. to 200° C. under the influence of a catalyst selected from the group consisting of organic peroxides and azobutyric dinitrile, substantially with exclusion of moisture.

5. Polymers of vinylphosphonic acid dichloride.

6. Copolymers of vinyl phosphonic acid dichloride with at least one member selected from the group consisting of styrene, alkylated styrenes, divinyl benzene, vinyl esters of acids having 1 to 18 carbon atoms, vinylidene chloride, butadiene, acrylonitrile, esters of acrylic acid with aliphatic alcohols having 1 to 4 carbon atoms, and esters of methacrylic acid with aliphatic alcohols having 1 to 4 carbon atoms.

7. Copolymers of vinyl phosphonic acid dichloride and acrylonitrile.

8. Copolymers of vinyl phosphonic acid dichloride and methylmethacrylate.

References Cited in the file of this patent

UNITED STATES PATENTS

| | | |
|---|---|---|
| 2,365,466 | Hamilton | Dec. 19, 1944 |
| 2,439,214 | Lindsey | Apr. 6, 1948 |
| 2,471,472 | Woodstock | May 31, 1949 |
| 2,694,684 | Rogers et al. | Nov. 16, 1954 |
| 2,871,263 | Short | Jan. 27, 1959 |
| 2,971,948 | Messwarb et al. | Feb. 14, 1961 |